US009828088B2

(12) United States Patent
Thompson et al.

(10) Patent No.: US 9,828,088 B2
(45) Date of Patent: Nov. 28, 2017

(54) SCISSORING FOLD ARRANGEMENT FOR DUAL PLANE FOUR BLADED ROTOR HUBS

(71) Applicant: BELL HELICOPTER TEXTRON INC., Fort Worth, TX (US)

(72) Inventors: Terry Thompson, Bedford, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 372 days.

(21) Appl. No.: 14/533,276

(22) Filed: Nov. 5, 2014

(65) Prior Publication Data

US 2016/0122013 A1     May 5, 2016

(51) Int. Cl.
*B64C 27/10* (2006.01)
*B64C 27/50* (2006.01)

(52) U.S. Cl.
CPC .............. *B64C 27/10* (2013.01); *B64C 27/50* (2013.01)

(58) Field of Classification Search
CPC ......... B64C 27/10; B64C 27/50; B64C 27/59; B64C 27/54; F05D 2250/90
USPC ................................ 416/105, 128, 143, 205
See application file for complete search history.

(56) References Cited

U.S. PATENT DOCUMENTS

| 3,771,924 A * | 11/1973 | Buchstaller | B64C 27/54 244/7 A |
| 2013/0149151 A1 * | 6/2013 | Rauber | B64C 27/43 416/141 |

* cited by examiner

*Primary Examiner* — Nathaniel Wiehe
*Assistant Examiner* — Peter T Hrubiec
(74) *Attorney, Agent, or Firm* — James E. Walton

(57) ABSTRACT

A rotor blade system includes a first hub assembly having a first set of rotor blades and rotatably attached to a rotor mast, a second hub assembly having a second set of rotor blades and rotatably attached to the rotor mast, the second hub assembly being positioned at a space relative to the first hub assembly, a torque splitter device engaged with both the first hub assembly and the second hub assembly, and a locking device operably associated with the torque splitter device. The method includes rotating the first hub relative to the second hub via the torque splitter until the first set of rotor blades align with the second set of rotor blade about a common horizontal axis.

9 Claims, 6 Drawing Sheets

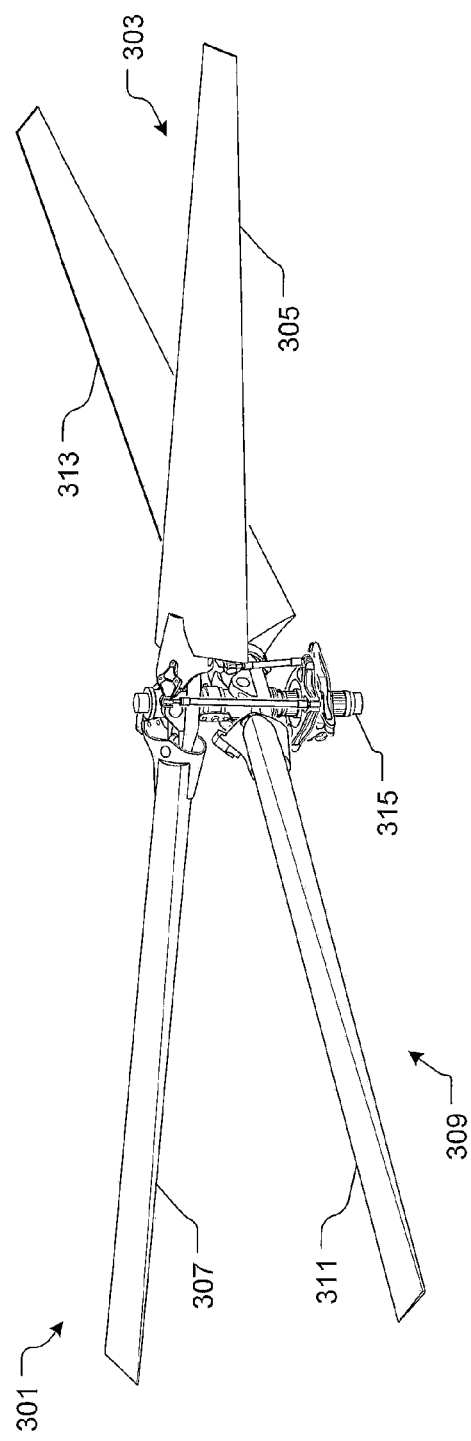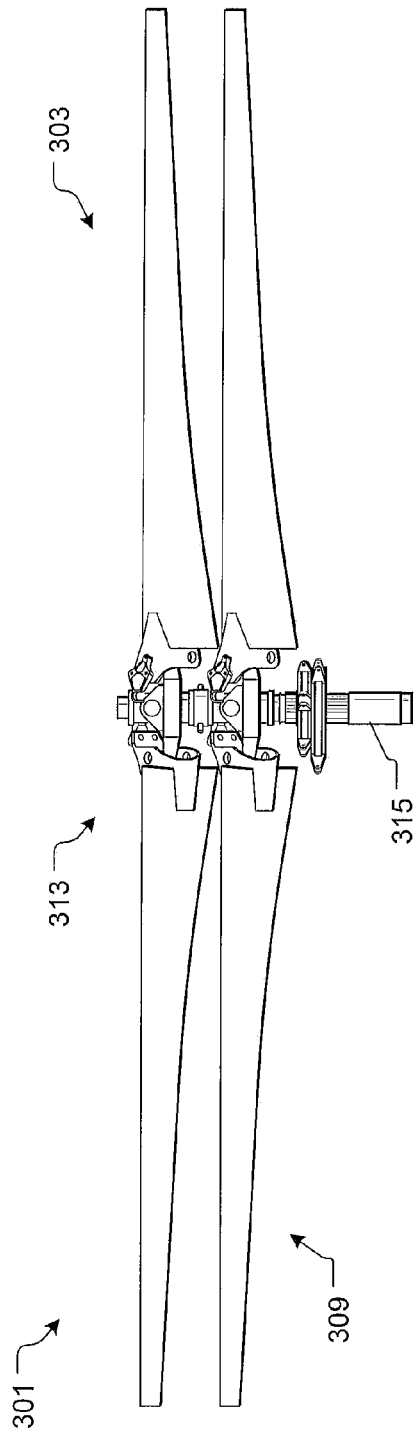
FIG. 3
FIG. 4

SCISSORING FOLD ARRANGEMENT FOR DUAL PLANE FOUR BLADED ROTOR HUBS

BACKGROUND

1. Field of the Invention

The present application relates generally to duel plane rotor systems, and more specifically, to a duel plane rotor system blade having scissoring folding features.

2. Description of Related Art

Duel plane rotor systems for helicopters are well known in the art and are necessary systems to create flight. The conventional duel plane rotor systems include two rotor hub assemblies positioned one above the other and configured to counter-rotate a plurality of rotor blades associated with each hub assembly. The duel plane stacked rotor system is well known and also the feature of scissoring the hub assemblies relative to each other for storage and transport. For example, the rotors may need to fold relative to each other to reduce their footprint for shipboard use and/or to stow in a hanger.

Although the foregoing developments in the field of rotor systems represent great strides, however many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is an oblique view of a rotor blade system in accordance with a preferred embodiment of the present application;

FIG. 4 is a side view of the rotor blade system of FIG. 3;

Figure 1:
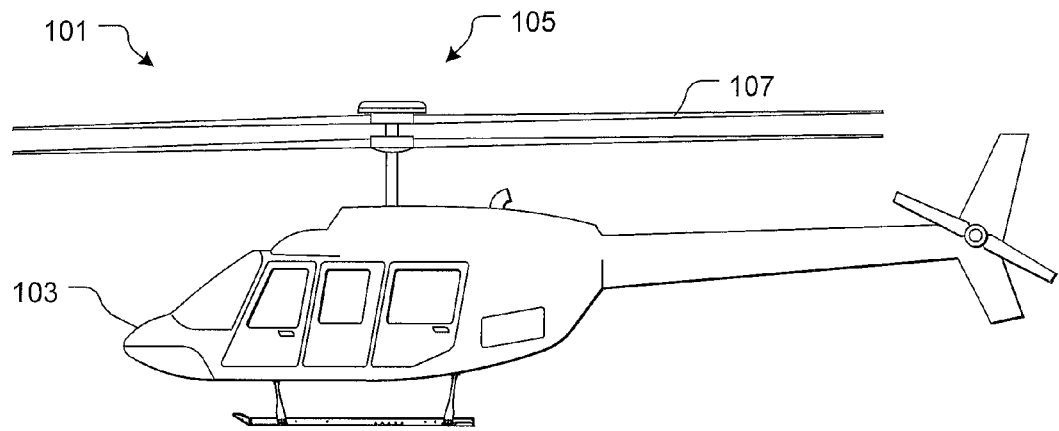
FIG. 1 is a side view of a helicopter according to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes problems commonly associated with conventional rotor systems. Specifically, the rotor system of the present application is provided with and utilizes a torque splitter devices associated with each rotor hub assembly to allow the hub assemblies to move relative to each other such that the blades of the hub assemblies are stacked in the same horizontal plane as each other. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight. In the exemplary embodiment, aircraft 101 includes two rotor hub assemblies each having two blades. The rotor assemblies are configured to counter-rotate relative to each other during flight.

Figure 2:
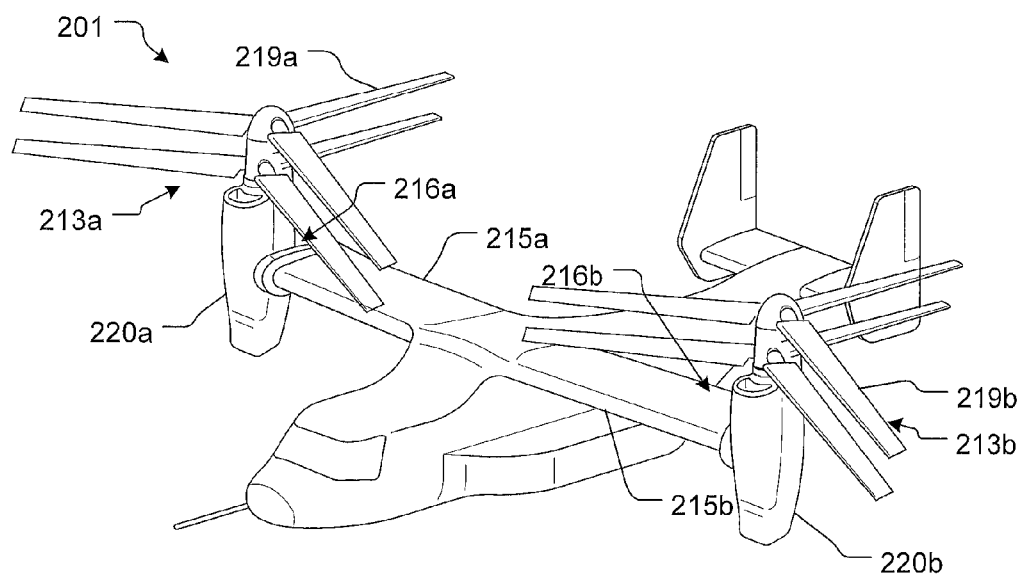
FIG. 2 is a perspective view of a tiltrotor aircraft according to an alternative embodiment of the present application.

Although shown associated with a helicopter, it will be appreciated that the system of the present application could also be utilized with different types of rotary aircraft and vehicles. For example, FIG. 2 illustrates a tiltrotor aircraft 201 that utilizes the system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft. Like aircraft 101, in the contemplated embodiment, aircraft 201 includes two rotor hub assemblies having three blades each and stacked relative to each other. Thus, it will be appreciated that the features discussed herein could be utilized on rotor assemblies having two or more blades.

Referring now to FIGS. 3 and 4 in the drawings, respective oblique and side views of a rotor system 301 are shown. In the preferred embodiment, rotor system 301 includes an upper rotor hub assembly 303 having two rotor blades 305, 307 and a lower rotor hub assembly 309 having two rotor blades 311, 313. During use, the rotor assemblies 303, 309 are rotatably attached to and configured to counter-rotate relative to each other about a mast 315.

Figure 5:
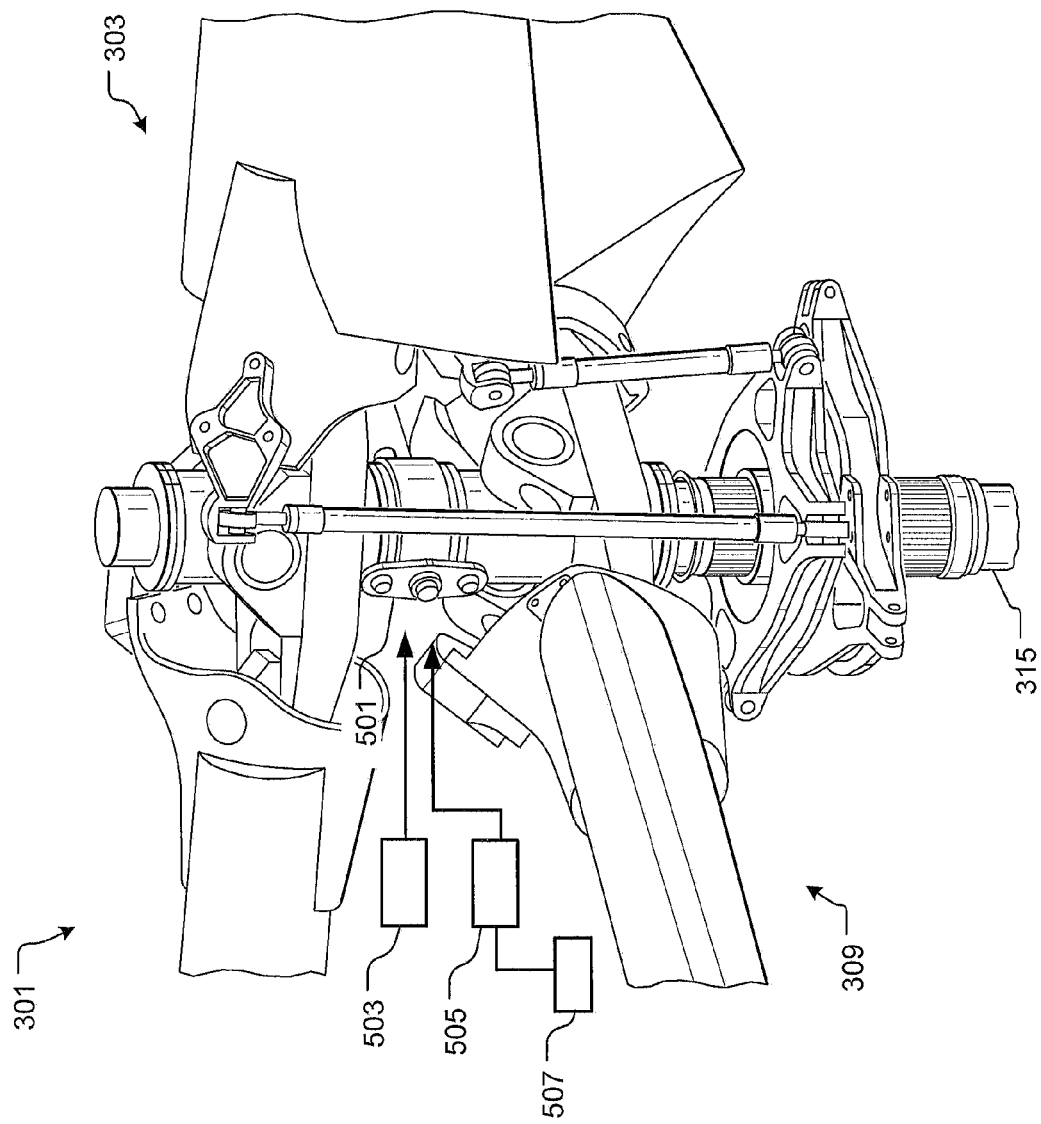
FIG. 5 is an oblique partial view of the rotor system of FIG. 3.

In FIG. 5, a partial oblique view of system 301 is shown. During flight, a torque splitter device 501 is used to control the rotational movement of the hub assemblies 303, 309 relative to each other. For example, it should be understood that the hub assemblies experience lead-lag movement, thus requiring the use of slight movement of the rotational movement of the hub assemblies relative to each other, which is turn is controlled via that torque splitter device 501. In the contemplated embodiment, a locking device 503 is operably associated with torque splitter device 501 to control the rotational movement of the hub assemblies relative to each other during flight. It will be appreciated that during the scissoring process of positioning the blade on the same horizontal plane, as depicted in FIG. 4, the locking device 503 unlocks the torque splitter device 501, which in turn enables the rotor hub assemblies 303, 309 to move freely relative to each other.

It is also contemplated having an actuator 505 operably associated with torque splitter device 501 and configured to rotate the torque splitter device, which in turn rotates the rotor hub assemblies to a position wherein the rotor blades are stacked in the same horizontal plane, as depicted in FIG. 4, during storage, and likewise rotated such that the blades are offset relative to each other, as depicted in FIG. 3. The actuator 505 in turn is controlled by a computer 507 manually or autonomously controlled by the user.

Figure 6:
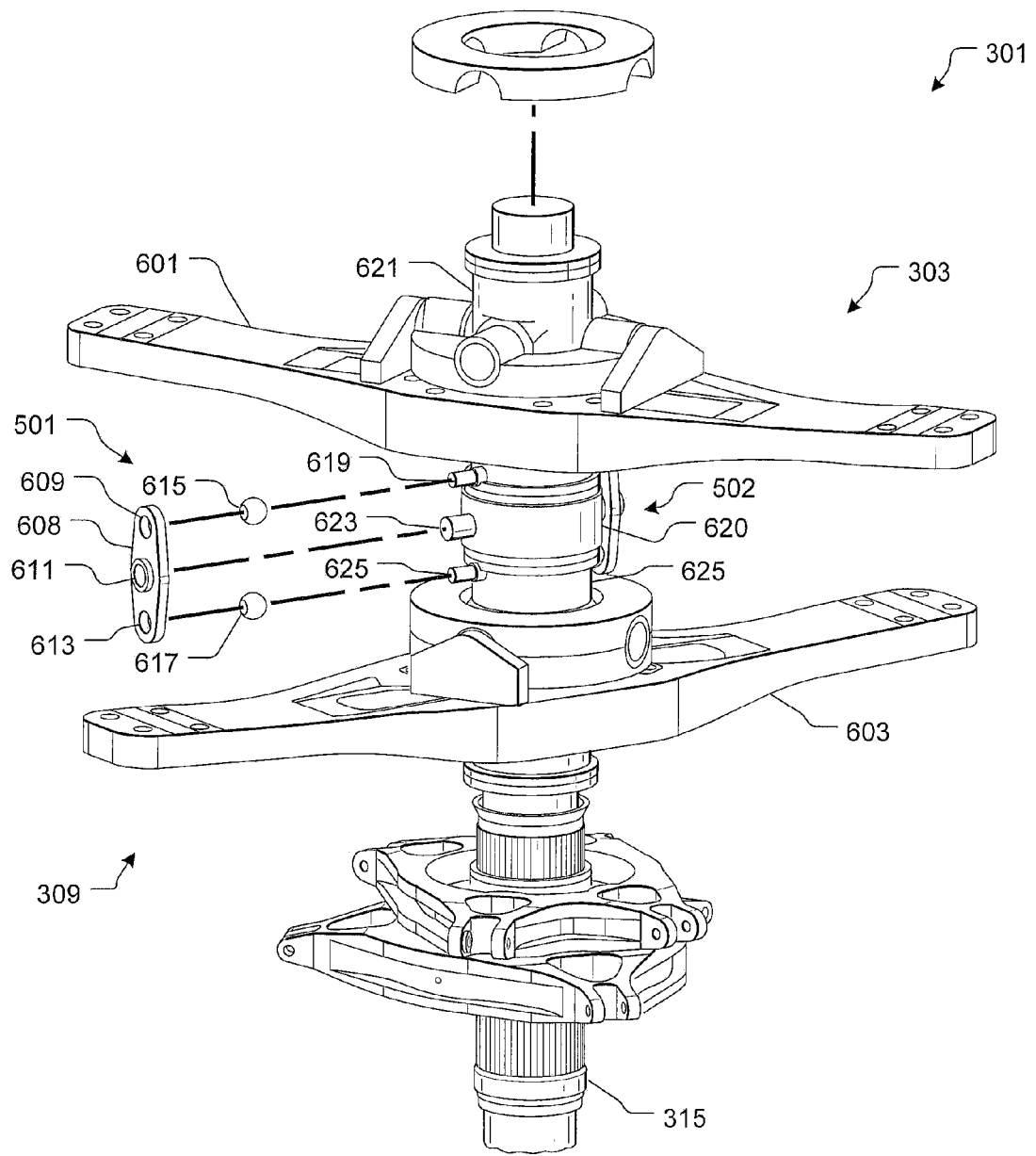
FIGS. 6 and 7 are exploded oblique views of the rotor system of FIG. 3.
Figure 7:
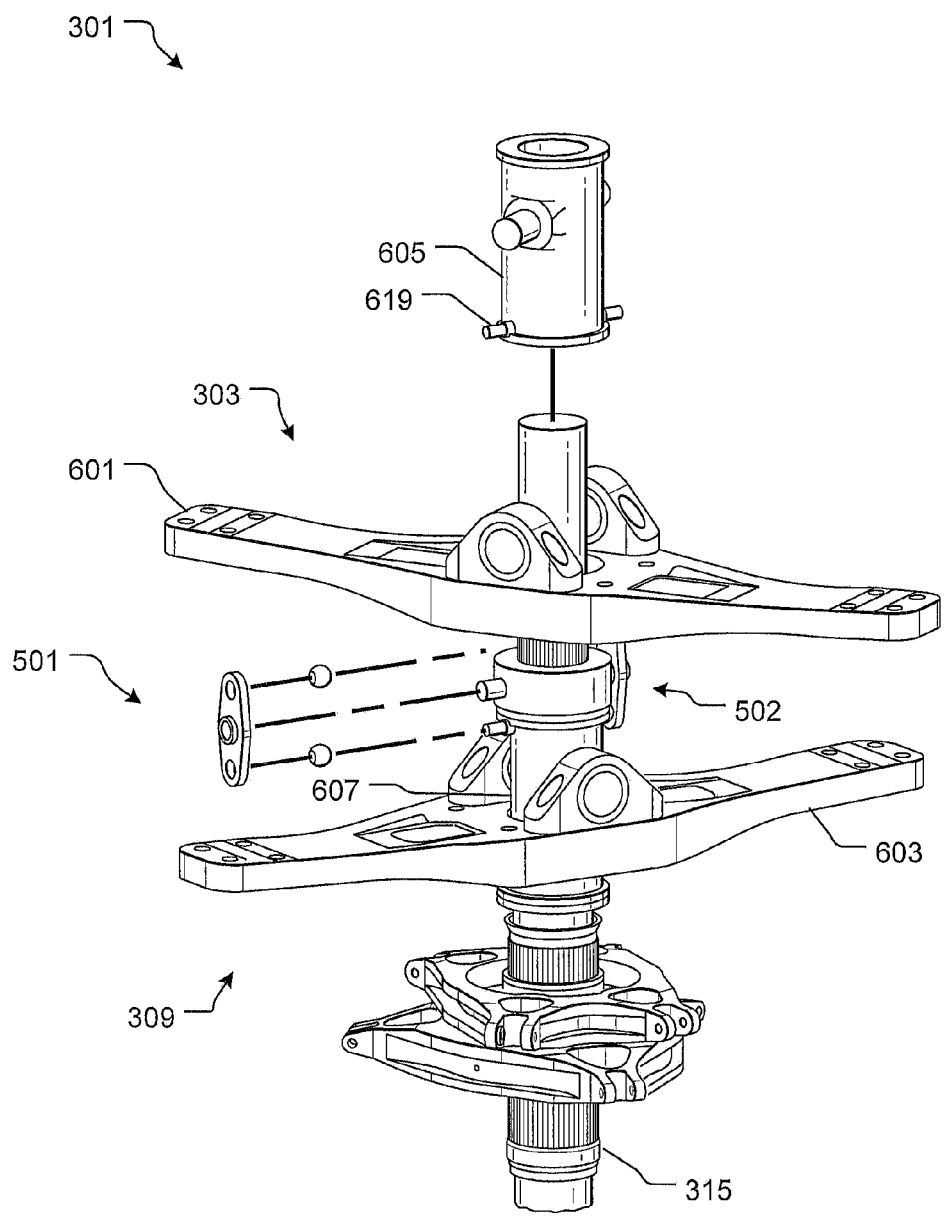

In FIGS. 6 and 7, exploded oblique views of system 301 are shown. Not all components of system 301 are shown, e.g., the rotor blades, for clarity.

Hub assembly 303 includes a hub 601 configured to secure the rotor blades 305, 307 to mast 315, while hub assembly 309 includes a hub 603 configured to secure the rotor blades 311, 313 to mast 315. The rotor hub assemblies 303, 309 are secured to the mast 315 via respective sleeves 605, 607, which in turn are configured to engage with mast 315 and rotate the hub assemblies.

It will be appreciated that system 301 includes two torque splitter devices 501 and 502, each device being positioned at different locations about mast 315 and substantially similar in form and function.

Torque splitter device 501 includes a base 608 having three openings 609, 611, and 613 extending through the thickness of the base 608 and configured to receive respective shafts 619, 623, and 625 of respective sleeves 605, 620, and 607. The torque splitter device 501 is further provided with two bearings 615, 617 that engages with respective openings 609, 613.

During operation, the torque splitter device 501 is configured to rotate about shaft 623 with opening 611. It should be understood that sleeve 620 fixedly rotates with mast 315 during flight, while the sleeves 605, 607 can be rotationally offset relative to sleeve 620 during flight due to lead-lag movement of the hub assemblies.

Figure 8:
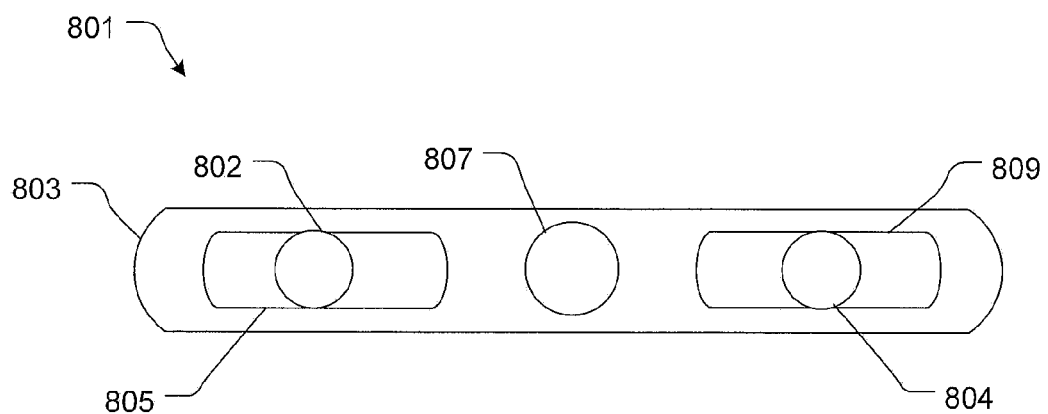
FIGS. 8 and 9 are simplified front views of torque splitter devices in accordance with an alternative embodiment of the present application.
Figure 9:
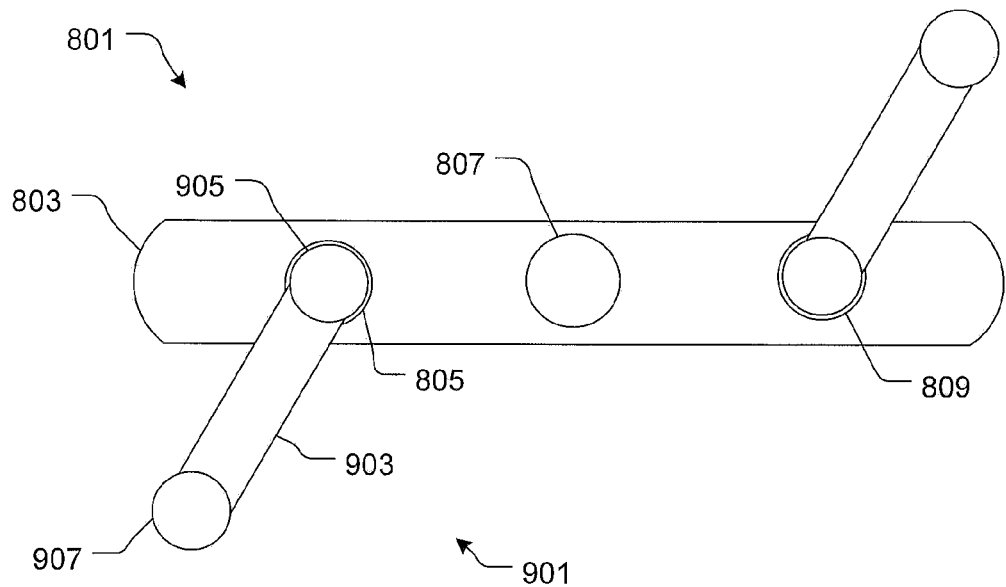

Referring now to FIGS. 8 and 9, simplified front views of torque splitter devices in accordance with an alternative embodiment of the present application are shown. It will be appreciated that the features of system 301 discussed herein are used with different types of torque splitter devices, for example, an torque splitter device 801, which is configured to extend the overall rotational movement of the hub assemblies relate to each other. This feature is achieved with openings 805, 809 configured to receive shafts 619, 625 therethrough. The openings allow the shafts to slide therein, which in turn extends the overall movement of the hub assemblies relative to each other. Thus, in the contemplated embodiment, torque splitter device 801 includes a body 803 with openings 805, 809, along with opening 807 extending through the thickness. In the contemplated embodiment, one or more fastening means, for example, fasteners 802, 804 are configured to slidingly engage with respective openings 805, 809.

In FIG. 9, it is also contemplated having an extension member 901 that engages with, for example, the shaft 619 about a first fastening means 907 and opening 805 about a second fastening means 905 that in turn are held together with an elongated body 903. The extension member 901 is configured to extend the overall movement of the hub assemblies relative to each other. It will be appreciated that although shown associated with torque splitter device 801, the extension member 901 could be used with other types of torque splitter devices, including torque splitter device 501.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor blade system, comprising:
   a first hub assembly having a first set of rotor blades and rotatably attached to a rotor mast;
   a second hub assembly having a second set of rotor blades and rotatably attached to the rotor mast, the second hub assembly being positioned at a space relative to the first hub assembly;
   a torque splitter device engaged with both the first hub assembly and the second hub assembly; and
   an actuator operably associated with the torque splitter;
   wherein the actuator is configured to rotate the torque splitter;
   wherein the torque splitter device is configured to allow movement of the of the first hub assembly relative to the second hub assembly; and
   wherein the torque splitter device comprises:
   a base;
   a first opening extending through the base and configured to receive a first shaft associated with the first hub assembly;
   a second opening extending through the base and configured to receive a second shaft associated with the second hub assembly; and an extension member configured to engage with the first opening and the first shaft.

2. The system of claim 1, wherein the first set of blades comprises a first rotor blade and a second rotor blade.

3. The system of claim 1, wherein the first hub assembly is operably associated with a tilt-rotor aircraft.

4. The system of claim 1, further comprising:
a computer operably associated with the actuator;
wherein the computer is configured to control the movement of the torque splitter via the actuator.

5. A torque splitter system for a dual hub rotor blade system, comprising:
a base;
a first opening extending through the base and configured to receive a first shaft associated with a first hub of the dual hub rotor blade system;
a second opening extending through the base and configured to receive a first shaft associated with a first hub of the dual hub rotor blade system; and
an extension member configured to engage with the first opening and the first shaft.

6. The system of claim 5, further comprising:
a third opening extending through the base and configured to receive a third shaft;
wherein the torque splitter is configured to rotate about the third shaft.

7. The system of claim 5, further comprising:
an actuator operably associated with the torque splitter;
wherein the actuator is configured to rotate the torque splitter.

8. The system of claim 7, further comprising:
a computer operably associated with the actuator;
wherein the computer is configured to control the movement of the torque splitter via the actuator.

9. A method to scissor a first set of rotor blades relative to a second set of rotor blades, the method comprising:
securing the first set of rotor blades to a first hub;
securing the second set of rotor blades to a second hub;
securing the first hub and the second hub coaxially along a rotor mast;
securing the first hub to the second hub via a torque splitter; and
rotating the first hub relative to the second hub via the torque splitter until the first set of rotor blades align with the second set of rotor blades about a common horizontal axis;
wherein the torque splitter device comprises:
a base;
a first opening extending through the base and configured to receive a first shaft associated with the first hub assembly;
a second opening extending through the base and configured to receive a second shaft associated with the second hub assembly; and
an extension member configured to engage with the first opening and the first shaft.

* * * * *